United States Patent
Webster et al.

(10) Patent No.: US 10,302,111 B1
(45) Date of Patent: *May 28, 2019

(54) EXPANDABLE JOINT AND UNIVERSAL FIT HEADBAND

(71) Applicant: Lightbulb, LLC, Franklin, TN (US)

(72) Inventors: Joe Webster, Nashville, TN (US); Rich Crim, Franklin, TN (US); Matt Lindley, Franklin, TN (US); Don Shepherd, Franklin, TN (US)

(73) Assignee: Lightbulb, LLC, Franklin, TN (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/382,904

(22) Filed: Dec. 19, 2016

Related U.S. Application Data

(63) Continuation of application No. 13/739,771, filed on Jan. 11, 2013, now Pat. No. 9,549,584.

(60) Provisional application No. 61/586,284, filed on Jan. 13, 2012.

(51) Int. Cl.
| | |
|---|---|
| *A41D 20/00* | (2006.01) |
| *F16B 7/10* | (2006.01) |
| *A42C 5/02* | (2006.01) |
| *A41F 9/02* | (2006.01) |
| *A41B 3/00* | (2006.01) |

(52) U.S. Cl.
CPC ............. *F16B 7/10* (2013.01); *A41B 3/00* (2013.01); *A41D 20/00* (2013.01); *A41F 9/025* (2013.01); *A42C 5/02* (2013.01)

(58) Field of Classification Search
CPC ............ A41D 20/00; A42B 1/041; A42C 5/02
See application file for complete search history.

(56) References Cited

U.S. PATENT DOCUMENTS

| | | | | |
|---|---|---|---|---|
| 2,832,077 | A * | 4/1958 | McGinnis | A42B 1/008 2/171 |
| 4,742,581 | A * | 5/1988 | Rosenthal | A41D 20/005 2/170 |
| 5,073,989 | A * | 12/1991 | Teague | A45D 8/36 2/181 |
| 9,549,584 | B2 * | 1/2017 | Webster | A42B 7/00 |
| 2016/0206024 | A1 * | 7/2016 | Madrid | A41D 20/00 |

* cited by examiner

*Primary Examiner* — Tajash D Patel
(74) *Attorney, Agent, or Firm* — Patterson Intellectual Property Law, P.C.; Ryan D. Levy; Grant M. Ford

(57) ABSTRACT

An expandable joint for use in, for example, a headband, includes elastic material, a low-friction sleeve, and a tube. The low-friction sleeve covers at least two opposing sides of a portion of the length of elastic material. The length of elastic material is affixed to the low-friction sleeve at a first end of the low-friction sleeve or a point adjacent to the first end of the low-friction sleeve. The length of elastic material extends beyond a second end of the low-friction sleeve opposite the first end of the low-friction sleeve. The tube substantially encloses the low-friction sleeve. The low-friction sleeve is affixed to the tube at the first end of the low-friction sleeve or a point adjacent to the first end of the low-friction sleeve, and the length of elastic material extends beyond a first end of the tube.

20 Claims, 2 Drawing Sheets

EXPANDABLE JOINT AND UNIVERSAL FIT HEADBAND

BACKGROUND

The invention relates to an apparatus having an elastic portion allowing the apparatus to fit a wide range of sizes. More particularly, the invention relates to securing the elastic portion to an inelastic portion of the apparatus.

Many items that are intended to fit on objects of different sizes use elastic to achieve that feat. For example, a headband that is meant to fit many different head sizes may be formed, at least partially, from an elastic material to enable the headband to automatically adjust to different size heads. One property of an elastic material is that it takes an increasing amount of force to stretch the elastic material an increased distance. To maximize wearer comfort and fit for wearers having very different size heads, some headbands include elastic around the entire circumference of the headband such that the headband stretches evenly and exerts even pressure on wearers having different head sizes. However, as the wearer puts the headband on, the circumference of the headband shrinks in the area of the headband in contact with the wearer's hair causing pulling and bunching of the wearer's hair. To prevent pulling and bunching of the wearer's hair, some headbands are formed from a length of inelastic material (e.g., fabric) intended to contact the wearer's hair and a length of elastic material intended to contact the back of the wearer's head. The ends of the inelastic material are attached to the ends of the elastic material to form the headband. This type of headband thus has a limited length of elastic material which will cause the headband to be looser on smaller heads and tighter on larger heads than a headband including elastic material about the entire circumference of the headband. Thus, while the headband can be used on different head sizes, it may be loose and fall off of smaller heads while being tight and uncomfortable on larger heads.

Elastic materials and bands formed partially of elastic material are used in other applications to achieve universal fit. For example, partial elastic materials are used in waistbands, shirt collars, hat sweatbands, masks, and eye patches.

BRIEF SUMMARY

In one aspect, an expandable joint includes a length of elastic material, a low-friction sleeve, and a tube. The low-friction sleeve covers at least two opposing sides of a portion of the length of elastic material. The length of elastic material is affixed to the low-friction sleeve at a first end of the low-friction sleeve or a point adjacent to the first end of the low-friction sleeve. The length of elastic material extends beyond a second end of the low-friction sleeve opposite the first end of the low-friction sleeve. The tube substantially encloses the low-friction sleeve. The low-friction sleeve is affixed to the tube at the first end of the low-friction sleeve or the point adjacent to the first end of the low-friction sleeve, and the length of elastic material extends beyond a first end of the tube.

In another aspect, a band operable to automatically adjust to a size within a range of sizes includes elastic material, a first low-friction sleeve, a second low-friction sleeve, and a tube. The length of elastic material has a first end and a second end. The first low-friction sleeve covers at least two opposing sides of a first portion of the length of elastic material adjacent the first end of the length of elastic material. The length of elastic material is affixed to the first low-friction sleeve at a first end of the first low-friction sleeve or a point adjacent to the first end of the first low-friction sleeve and the first end of the length of elastic material. The second low-friction sleeve covers at least two opposing sides of a second portion of the length of elastic material adjacent the second end of the length of elastic material. The length of elastic material is affixed to the second low-friction sleeve at a first end of the second low-friction sleeve or a point adjacent to the first end of the second low-friction sleeve and the second end of the length of elastic material. The tube has a first end and a second end, and the first and then the second and are not enclosed. The first low-friction sleeve is affixed to the tube adjacent the first end of the tube at the first end of the first low-friction sleeve or the point adjacent to the first end of the first low-friction sleeve. The second low-friction sleeve is affixed to the tube adjacent the second end of the tube at the first end of the second low-friction sleeve or the point adjacent to the first end of the second low-friction sleeve.

In one embodiment, a length of elastic material forms an expandable joint with a fabric to make an item including the expandable joint fit better on objects of different sizes. Unlike the traditional method of sewing the end of the elastic directly to the end of the adjacent fabric, in this embodiment, the elastic is sewn between two pieces of fabric at a point in the fabric away from the end of the fabric, wherein the fabric is forming tube substantially enclosing the length of elastic material. The end of the elastic material is encased in a small, semi-rigid plastic sleeve to prevent the fabric tube from bunching up around the elastic material when the elastic material is stretched. A headband including a pair of these expandable joints feels tighter on smaller heads and looser on larger heads, for a better overall fit than headbands employing the prior art method of sewing the end of the elastic material directly to the end of the adjacent fabric. The better overall fit also makes wearing the headband more comfortable. Although the example given is for headbands, the technology for connecting the elastic can be used in a wide range of items that use elastic to create an item with a universal fit including hat sweatbands, waistbands, shirt collars, etc.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
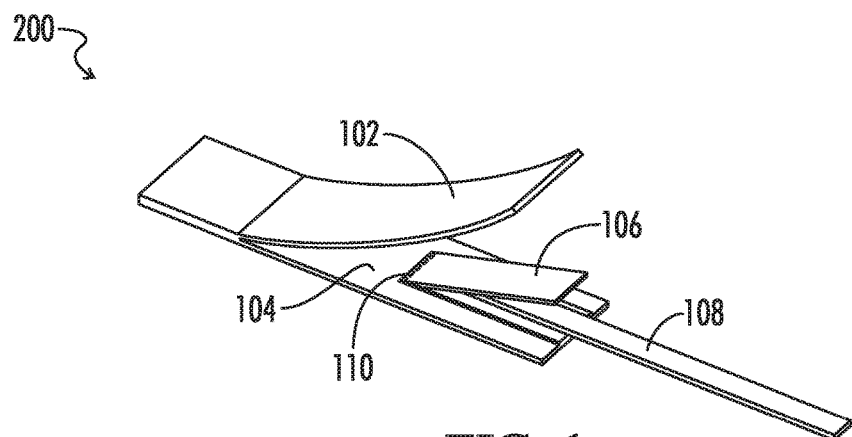
FIG. 1 is an isometric view of an expandable joint.

Referring to FIG. 1, a partially assembled expandable joint 200 shows a connection of a length of elastic material 108 to an inelastic material (e.g., first fabric 102 and second fabric 104). A length of a first fabric 102 is affixed to a length of a second fabric 104 along corresponding edges to form a tube having an at least partially open end. In one embodiment, the first fabric 102 is a decorative fabric ribbon intended to be on the front or visible portion of a headband including the expandable joint 200. In one embodiment, the second fabric 104 is a fabric selected to hold a headband including the expandable joint 200 in place on a user's head such as a velvet material. A semi-rigid plastic sleeve 106 is formed by folding a flat piece of plastic approximately in half about any end of a length of elastic material 108. The semi-rigid plastic sleeve 106 prevents the headband fabric (i.e., first fabric 102 and second fabric 104) from bunching up when the length of elastic material 108 is stretched. A sewn seam 110 connects the semi-rigid plastic sleeve 106 and the length of elastic material 108 to the second fabric 104 at a point adjacent to a first end of the semi-rigid plastic sleeve 106. In one embodiment, an end of the length of the first fabric 102 is folded back, and an end of the length of the second fabric 104 is folded back, such that the ends of the length of the first fabric 102 and the length of the second fabric 104 are inside the tube formed by the first fabric 102 and the second fabric 104. The low-friction sleeve 106 may be approximately even with the end of the tube formed by the first fabric 102 and the second fabric 104 or slightly set back from the end of the tube by about ⅛ of an inch. The tube formed by the first fabric 102 and the second fabric 103 substantially encloses the low-friction sleeve 106.

Figure 2:
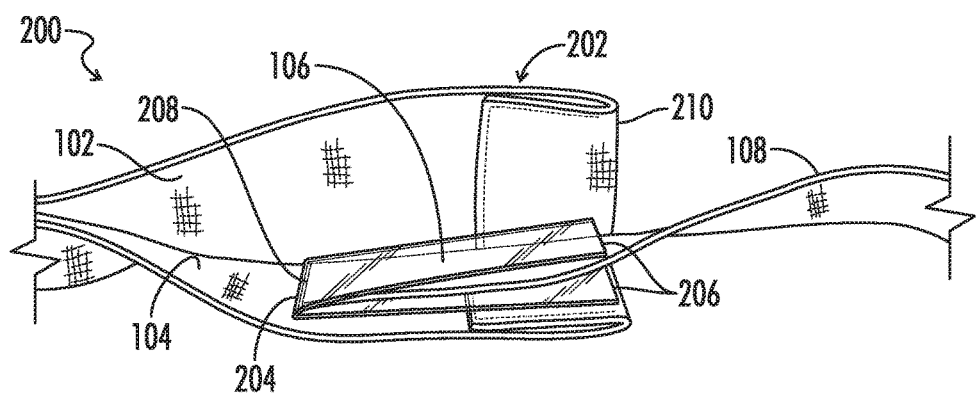
FIG. 2 is a perspective side view of a headband having a partially assembled expandable joint.
Figure 3:
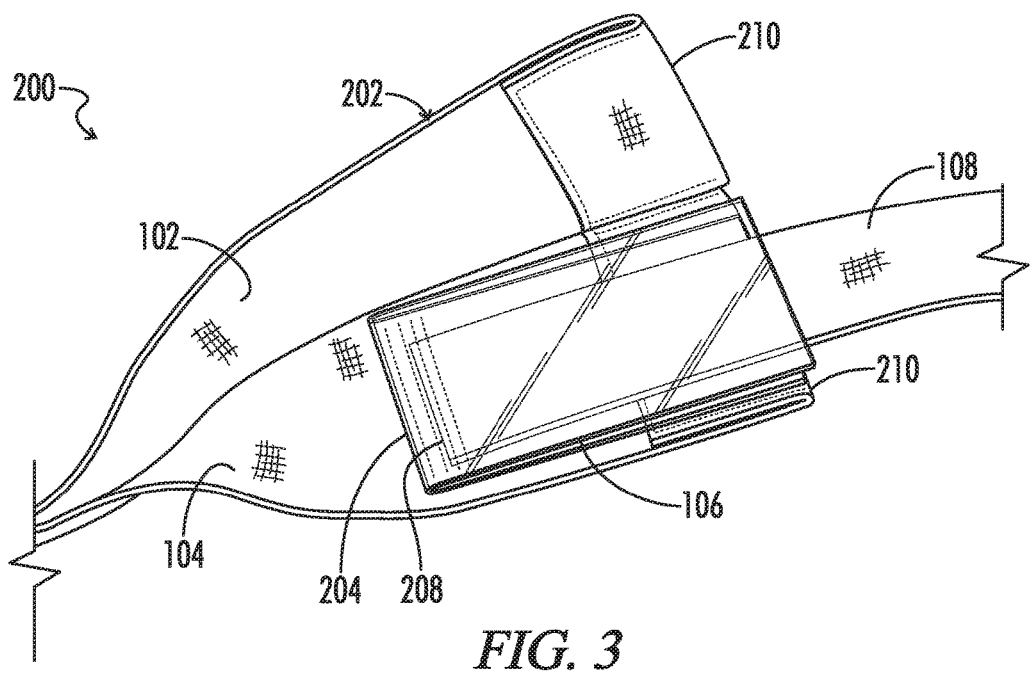
FIG. 3 is an elevated perspective side view of the headband of FIG. 2 showing assembly of the expandable joint.

Referring to FIGS. 2 and 3, an expandable joint 200 includes a length of elastic material 108, resilience sleeve 106, and a tube 202. The expandable joint 200 is shown partially assembled for illustrative purposes. The low-friction sleeve 106 covers two opposing sides of a portion of the length of elastic material 108. In this context, low-friction means having a coefficient of friction low enough with respect to the length of elastic material that the elastic material can contract within the sleeve 106 without deforming the tube 202. The low-friction sleeve 106 may be rigid, semi-rigid, and/or resilient such as various plastics and metals when used with a fabric based length of elastic material 108. The low-friction sleeve 106 has a first end 204 and a second end 206 opposite the first end 204. The low-friction sleeve 106 is affixed to the tube 202 at the first end 204 of the low-friction sleeve 106 or a point adjacent to the first end 204 of the low-friction sleeve 106. As shown in FIGS. 2 and 3, the low-friction sleeve 106 is affixed to the tube 202 at the point adjacent to the first end 204 of the low-friction sleeve 106 by a stitch through the low-friction sleeve 106, the length of elastic material 108, and the tube 202. In the illustrated embodiment, the stitch is through the second fabric 104 (e.g., velvet), but not the first fabric 102. In one embodiment, the low-friction sleeve 106 is formed of a smooth, semi-rigid plastic and may be a flat piece of plastic folded approximately in half about the first end of the length of elastic material 108.

The length of elastic material 108 is affixed to the low-friction sleeve 106, and the length of elastic material 108 extends beyond the second ends 206 of the low-friction sleeve 106. In one embodiment, the length of elastic material 108 is affixed the low-friction sleeve 106 at the first end 204 of the low-friction sleeve 106 or point adjacent to the first end 204 of the low-friction sleeve 106. As shown in FIG. 2, a first end 208 of the length of elastic material 108 is attached the low-friction sleeve 106 point adjacent to the first end 204 of the low-friction sleeve 106. However, the length of elastic material 108 may also be attached to the low-friction sleeve 106 at a point adjacent to the first end 208 of the length of elastic material 108. The length of elastic material 108 is only affixed to the low-friction sleeve 106 and/or the tube 202 at the first end 208 of the low-friction sleeve 106 at the first end 208 of the length of elastic material 108 and/or the point adjacent to the first end 208 of the length of elastic material 108. That is, the length of elastic material 108 is not affixed to the low-friction sleeve 106 or tube 202 near the first end 210 of the tube 202 such that the portion of the length of elastic material 108 covered by the low-friction sleeve 106 may expand and contract within the low-friction sleeve 106. In one embodiment, the length of elastic material is elastic band and the portion of the length of elastic material 108 covered by the low-friction sleeve 106 is from the first end of the length of elastic material 208 to about 1 inch from the first end 208 of the length of elastic material 108.

Figure 4:
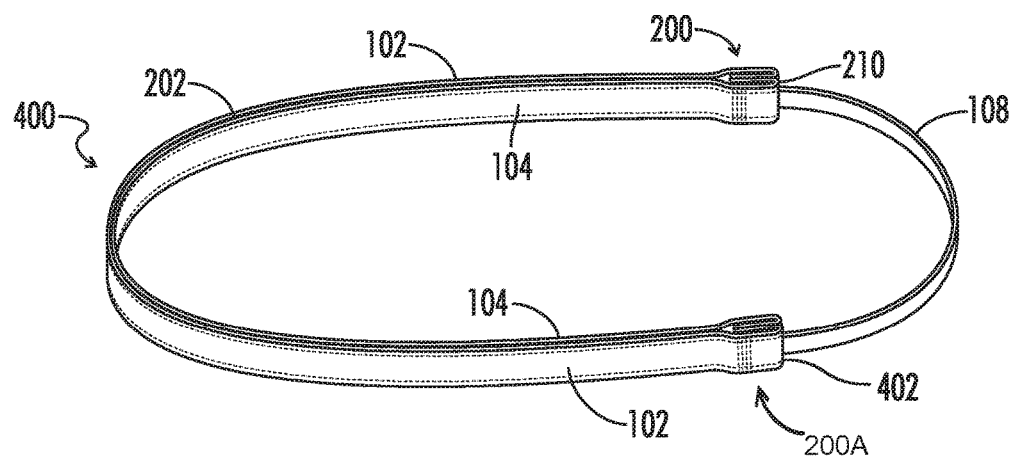
FIG. 4 is an elevated perspective side view of a headband having a pair of expandable joints.

The tube 202 substantially encloses the low-friction sleeve 106 when the expandable joint 200 is fully assembled (see FIG. 4). That is, the tube 202 substantially prevents the low-friction sleeve 106 from being seen by an observer outside of the fully assembled expandable joint 200. The tube 202 has a first end 210 and a second end 402 opposite the first end 210. The low-friction sleeve 106 is affixed to the tube 202, and the length of elastic material 108 extends beyond the first end 210 of the tube 202. In one embodiment, the tube 202 is flexible and may be formed of fabric. In one embodiment, the tube 202 includes a length of material having to opposing edges affixed to one another. In another embodiment, the tube 202 includes a length of a first material 102 (e.g., a first side or a first fabric such as a decorative fabric) having a first edge opposite a second edge of the first material and a length of a second material 104 (e.g., a second side or a second fabric such as a velvet ribbon) having a first edge opposite a second edge of the second material. The first edge of the first material 102 is affixed to the first edge of the second material 104, and the second edge of the first material 102 is affixed to the second edge of the second material 104 such as by sewing. The length of the first material 102 has a first end at the first end 210 of the tube 202, and a portion of the length of the first material 102 is folded back into the tube 202 at the first end 210 of the tube 202. The length of the second material 104 has a first end at the first end 210 of the tube, and a portion of the length of the second material 104 is folded back into the tube 202 at the first end 210 of the tube 202.

In one embodiment, the length of elastic material 108 is affixed to the low-friction sleeve 106 and the tube 202 substantially enclosing the low-friction sleeve 106 at the first end 204 of the low-friction sleeve 106 or a point adjacent to the first end 204 of the low-friction sleeve 106 by a seam sewn through the tube 202, low-friction sleeve 106, and length of elastic material 108 at a point adjacent to the first end 204 of the low-friction sleeve 106. In one embodiment, the second end 206 of the low-friction sleeve 106 beyond which the length of elastic material 108 extends is substantially aligned with the first end 210 of the tube 202 beyond which the length of elastic material 108 extends, or in an alternative embodiment, the second end 206 of the low-friction sleeve 106 is set back approximately ⅛ of an inch from the first end 210 of the tube 202.

Referring now to FIG. 4, a band 400 is fully assembled including a first expandable joint 200 and a second expandable joint 200A. Both the first expandable joint 200 and the second expandable joint 200A are constructed as described above with respect to FIGS. 1-3. The band 400 is operable to automatically adjust to a size within a range of sizes. The exemplary band 400 illustrated in FIG. 4 is a headband. The band 400 includes a length of elastic material 108, a first low-friction sleeve 106, a second low-friction sleeve (not visible in this fully assembled illustration), and a tube 202. The length of elastic material 108 has a first end 208 and a second end opposite the first end 208. The first low-friction sleeve 106 covers at least 2 opposing sides of a first portion of the length of elastic material 108 adjacent the first end 208 of the length of elastic material 108. The second low-friction sleeve covers at least 2 opposing sides of a second portion of the length of elastic material 108 adjacent the second end of the length of elastic material 108. The tube 202 has a first end 210 and a second end 402 opposite the first end 210. The first end 210 and the second end 402 are not enclosed (i.e., they are at least partially open). The first low-friction sleeve 106 is affixed to the tube 202 adjacent the first end 210 of the tube 202, and the second low-friction sleeve is affixed to the tube 202 adjacent the second end 402 of the tube 202. The first low-friction sleeve 106 is substantially enclosed by the tube 202, and the second low-friction sleeve is substantially enclosed by the tube 202. In one embodiment, the first portion of the length of elastic material 108, and the second portion of the length of the elastic material 108 are each approximately 1 inch long. That is, the portion of each end of the elastic material 108 covered by a low-friction sleeve is approximately 1 inch long. First low-friction sleeve 106 is affixed to the tube 202 at the first end of the first low-friction sleeve 106 or a point adjacent to the first end of the first low-friction sleeve, and the second low-friction sleeve is affixed to the tube 202 at a first end of the second low-friction sleeve or a point adjacent to the first end of the second low-friction sleeve. In one embodiment, the second ends of the first and second low-friction sleeves are each set back from the corresponding end of the tube 202 by approximately ⅛ of an inch. In one embodiment, the tube 202 includes a length of a first material 102 having a first edge opposite a second edge, and a length of a second material 104 having a first edge opposite a second edge. The first edge of first material 102 is affixed to the first edge of the second material 104, and the second edge of the first material 102 is affixed to the second edge of the second material 104 so as to form the tube 202. In one embodiment, the first material is a decorative fabric, and the second fabric is a velvet ribbon.

The expandable joint 200 may be used in for example a snorkeling facemask, a bracelet, a watch band, or a hat. It is also contemplated that the tube 202 may be round, such as a rubber or latex tube; that the sleeve 106 may be a tube having a round or rectangular cross section; and that the length of elastic material 108 may be an elastic material, length of rubber, length of latex, length of nitrile, or any other material exhibiting significant elasticity.

In one embodiment a first low-friction sleeve 106 at a first expandable joint 200 and a second low-friction sleeve at a second expandable joint 200A of a band 400 (e.g., a headband) are formed from a single piece of material. This may be beneficial such as in a headband application to help maintain an outer fabric of the headband in a flat and outward facing position when in use (i.e., when being worn by a user). In such a configuration, the low-friction sleeve 106 may be sewn along the lengthwise edges of a first material 102 and a second material 106 forming the tube 202.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful EXPANDABLE JOINT AND UNIVERSAL FIT HEADBAND, it is not intended that such references be construed as limitations upon the scope of this invention except as set forth in the following claims.

What is claimed is:
1. An expandable joint comprising:
   at least one section of a first material;
   a sleeve connected to the at least one section of the first material, the sleeve including:
      a sleeve exterior wall in contact with the at least one section of the first material;
      a sleeve interior wall opposite the sleeve exterior wall;
      a sleeve length; and
      wherein the sleeve exterior wall is enveloped by the at least one section of the first material along a majority of the sleeve length; and
   a length of a second material including a second material first end and a second material second end, at least a portion of the second material in contact with the sleeve interior wall and connected to the sleeve nearer the second material first end than the second material second end.

2. The expandable joint of claim 1, wherein the at least one section of the first material includes a single section of the first material configured to form a tube.

3. The expandable joint of claim 2, wherein the single section of the first material includes two opposing lengthwise edges affixed to one another to form the tube.

4. The expandable joint of claim 1, wherein the at least one section of the first material includes two sections of the first material configured to form a tube.

5. The expandable joint of claim 4, wherein each of the two sections of the first material includes a pair of lengthwise edges, and each of the lengthwise edges of one of the two sections of the first material is affixed to a respective lengthwise edge of another of the two sections of the first material to form the tube.

6. The expandable joint of claim 5, wherein both of the two sections of the first material further includes a first material joint end, and a portion of each section of the first material is folded back such that the first material joint ends include folded ends of the two sections of the first material.

7. The expandable joint of claim 1, wherein the first material is less elastic than the second material.

8. The expandable joint of claim 1, wherein at least one of the sleeve interior wall and the sleeve exterior wall has a lower coefficient of friction than at least one of the first material and the second material.

9. The expandable joint of claim 1, wherein the length of the second material further includes a first strip side and a second strip side, and the first strip side and the second strip side both contact the sleeve interior wall.

10. The expandable joint of claim 1, wherein the sleeve further includes a section of folded sleeve material such that sections of the sleeve interior wall face each other.

11. The expandable joint of claim 1, wherein:
the at least one section of the first material includes a first material joint end;
the sleeve further includes a sleeve inward end and a sleeve outward end opposite the sleeve inward end, the sleeve outward end nearer the first material joint end of the first material than the sleeve inward end; and
the second material is connected to the sleeve nearer the sleeve inward end than the sleeve outward end.

12. The expandable joint of claim 11, wherein the length of the second material extends beyond the sleeve outward end of the sleeve and the first material joint end of the at least one section of the first material.

13. The expandable joint of claim 11, wherein the sleeve is connected to the at least one section of the first material nearer the sleeve inward end than the sleeve outward end.

14. The expandable joint of claim 11, wherein the first material joint end of the at least one section of the first material is substantially aligned with the sleeve outward end of the sleeve.

15. The expandable joint of claim 11, wherein the second material is connected to the sleeve only nearer the sleeve inward end than the sleeve outward end.

16. The expandable joint of claim 11, wherein the sleeve outward end of the sleeve is offset from the first material joint end of the at least one section of the first material by about $1/8$ of an inch.

17. The expandable joint of claim 1, wherein about an inch of the second material, measured from the second material first end, is enveloped by the sleeve and the at least one section of the first material.

18. The expandable joint of claim 1, wherein the sleeve is more rigid than at least one of the first material and the second material.

19. The expandable joint of claim 1, wherein the sleeve is connected to the at least one section of the first material on only one face of the sleeve exterior wall.

20. The expandable joint of claim 1, wherein the first material, the sleeve, and the second material are all sewn together.

\* \* \* \* \*